United States Patent Office 2,970,038
Patented Jan. 31, 1961

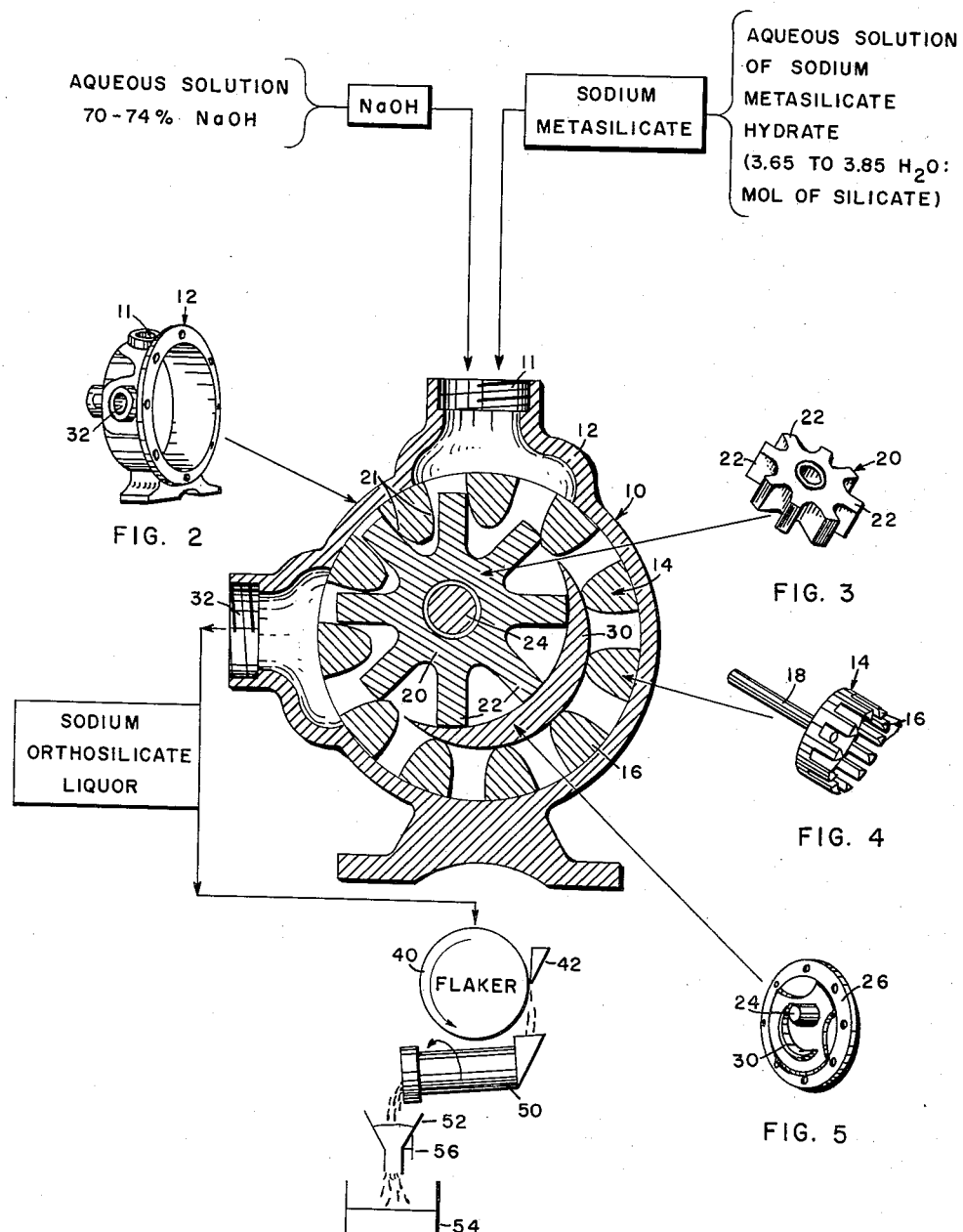

2,970,038
PREPARATION FOR THE PRODUCTION OF ALKALI METAL SILICATES

John P. Hyde, Euclid, Ohio, assignor to Diamond Alkali Company, Cleveland, Ohio, a corporation of Delaware Filed Nov. 8, 1957, Ser. No. 695,367

10 Claims. (Cl. 23—110)

This invention relates to a new and improved process for producing crystalline alkali metal silicates having improved properties and more particularly relates to the preparation of highly-soluble alkali metal silicates, especially sodium silicates having good stability in packaged form, the said silicates being chemically defined as to sodium oxide and silicon dioxide content by a molar ratio of $Na_2O:SiO_2$ within the range from about 1.75–2.25:1.0.

For convenience in describing the invention, the term "orthosilicate" is employed to denote the class of silicates especially contemplated by this general formula designation. The alkali metal portion of the silicates of this invention may be any of the alkali metals, including cesium, lithium, sodium, potassium and rubidium, although, of course, the most common commercially available silicates are sodium silicates. Accordingly, reference hereinafter is made particularly to sodium silicates, although it is to be understood that the invention is not so limited. Insofar as chemical constitution is concerned, silicates generally similar to those produced in accordance with this invention are known in the art and are useful in various laundering and detergent applications, textile finishing, paint removers, metal degreasing and the like.

The process of this invention is an improvement over the invention described and claimed in Ser. No. 397,525, McDaniel, filed December 11, 1953, and now abandoned. While the invention described and claimed in the aforementioned McDaniel application does, indeed, represent a significant advance over the prior art, it has been found, in practice, when extended or continuous operation is practiced, at times certain practical difficulties in operation have arisen in that a disadvantageous accumulation of orthosilicate in the mixing apparatus has rendered continuous operation difficult or impossible. It is to the avoidance of such difficulty that the present invention is directed.

Accordingly, the principal object of this invention is to provide a new and improved method of forming alkali metal silicates, especially sodium silicates having an $Na_2O:SiO_2$ molar ratio within the range from 1.75–2.25:1.

A further object of the invention is to provide a new and improved method of forming sodium orthosilicate especially adapted for continuous operation.

These and other objects and advantages of the invention will more fully appear from the following description thereof.

Orthosilicates that are generally similar to those of this invention, for example, $Na_4SiO_4 \cdot 5H_2O$, may be prepared according to methods described in U.S. Patent No. 2,131,718, McDaniel. In accordance with the teaching of that patent, caustic soda (76% $Na_2O$ lye flake) is combined with sodium metasilicate liquor

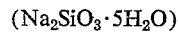

in quantities calculated to provide the necessary alkali-silica molecular ratio for the formation of the desired silicate. The reaction takes place with very rapid agitation and is complete within about 3 to 4 minutes. Substantially immediately upon completion of the reaction, the formed orthosilicate liquor is delivered to a heated flaking drum where it undergoes thermal crystallization forming a dry solid product in the form of flakes resembling soap chips or flakes of mica. The flaking drums generally are steam heated to a temperature of about 100° to 175° C. and desirably to a temperature of about 100° to 160° C. and thermal crystallization, i.e., crystallization, which takes place upon application of heat, is complete within a very short time.

Co-pending McDaniel application Ser. No. 397,525, filed December 11, 1953, is directed to an improvement over the prior McDaniel patent in that certain practical difficulties inherent with the use of flake caustic are avoided, the co-pending application disclosing and claiming the preparation of orthosilicates by combining a sodium metasilicate hydrate liquor with an aqueous sodium hydroxide, the sodium hydroxide concentration preferably being about 70% to 74% (about 55% to 58% $Na_2O$), thus avoiding the use of anhydrous caustic soda.

As pointed out previously, the co-pending McDaniel application deals especially with the formation of sodium silicates wherein the $Na_2O:SiO_2$ molar ratio is about 2:1, in which silicates water is present to the extent of about 5 to 6 molecular parts, by the process of dehydrating a sodium metasilicate hydrated liquor from any given degree of hydration, e.g., the pentahydrate down to about 3.65–3.85 mols of water, thus providing a compound having the formula $Na_2O:SiO_3 \cdot 3.65$–$3.85 \, H_2O$ and combining therewith an aqueous alkali metal hydroxide, especially sodium hydroxide.

While the process of the co-pending McDaniel application represents an improvement over the process of the McDaniel patent, it has now been found that an even more advantageous operation is provided by the practice of the present invention which avoids the heretofore-encountered accumulation and/or depositing of sodium silicate in the cone-shaped mixer of the type disclosed in the co-pending McDaniel application.

Accordingly, the present invention comprises, in the manufacture of solid, hydrated alkali metal silicates having an alkali metal oxide:$SiO_2$ molar ratio substantially within the range from about 1.75–2.25:1.0 from a mixture of an aqueous alkali metal silicate hydrate solution comprising an alkali metal metasilicate and an alkali metal hydroxide to give the desired alkali metal oxide:$SiO_2$ ratio within said range, by combining said alkali metal hydroxide and said metasilicate solution, and intimately mixing and heating the resulting mixture to cause thermal crystallization of the hydrated silicate, the improvement which includes the steps of intimately mixing the alkali metal metasilicate hydrate solution and alkali metal hydroxide solution in a mixer-pump having at least one rotary, toothed impeller meshing with another element whereby substantially instantaneous, intimate mixing and chemical reaction of the reactants is accomplished and self-cleaning of the mixer-pump effected, and heating the resultant mixture sufficiently to cause thermal crystallization of the hydrated silicate.

In accordance with a preferred practice of the invention, the water content of an aqueous alkali metal metasilicate hydrate is adjusted to a water content of about 3.2 to 3.6 mols water per mol of metasilicate, e.g., $Na_2O \cdot SiO_2 \cdot 3.2$ to $3.6 \, H_2O$, preferably 3.4, and there is added to such a solution an aqueous solution of an alkali metal hydroxide desirably of a concentration within the range from about 70% to 74% thereof by weight, e.g., 70% to 74% NaOH, preferably 73% NaOH. These reactants are then combined in an internally-geared mixer-pump of the type herein-described.

Thus, this invention resides in the use as a mixer for the two reactants a pump having an inlet and outlet and comprising a housing and at least one rotatable impeller therein having only a small clearance between impelling parts therein whereby rapid, intimate mixing and self-cleaning action are effected, more particularly, the pump comprises a rotary pump including a housing and at least one impeller, preferably, two, therein such as a toothed gear wheel, helical gear, lobed cam, or the like, whereby only a small clearance exists between impelling elements. A preferred mixer-pump in the practice of this invention comprises a pump housing containing a driven, cylindrically-shaped hollow rotor having uniformly, circumferentially-spaced longitudinal openings therethrough adapted to contain and actuate a toothed gear impeller disposed eccentrically therein whereby meshing of the gear and rotor is effected and a high degree of shearing, dispersive mixing is effected.

An advantageous type of commercially available pump useful in the practice of this invention is the "Viking" rotary pump employing as impellers, a gear within a gear, i.e., having a driven, toothed rotor adapted to rotate within a stationary pump housing, the portion of the rotor within said housing comprising uniformly circumferentially, spaced generally triangular curved trapezoidal cross-sectioned, cam-surfaced, cylinder-defining elements. In the pump housing is a toothed impeller or idler eccentrically disposed with respect to the longitudinal axis of the rotor and rotated by engagement of its teeth in the openings of the rotor, e.g., at about 15 to 20 r.p.m. or higher if desired.

Those skilled in the art will appreciate that the chemistry and practice in the alkali metal silicate art is notoriously complex and even at this date not completely understood. However, it has been found by experience that certain conditions are advantageous and others must be achieved if a desirable flakable silicate product is to be obtained. For example, it has been found that if a partially-dehydrated metasilicate liquor and aqueous sodium hydroxide are brought together continuously in small increments in predetermined relative quantities under conditions whereby a small quantity of orthosilicate liquor is formed and is continuously and rapidly delivered to a flaking drum substantially immediately upon formation at a flow rate equal to the rate of liquor formation as is readily accomplished by the practice of the present invention that a highly advantageous product will be obtained.

It also will be appreciated that by the practice of the present invention the silicate liquor delivered to the flaking drum is always of the same age and moreover, it is always a new liquor since substantially instantaneous mixing is achieved with the result that the liquor is quite free-flowing and may be spread upon the drums in a thin layer thermally crystallizable into correspondingly thin flakes.

Referring now to the accompanying drawings:

Fig. 1 illustrates in schematic and fragmentary sectional form the practice of the present invention as applied to the manufacture of sodium orthosilicate;

Fig. 2 is an isometric view of the mixer-pump housing;

Fig. 3 is an isometric view of the toothed impeller;

Fig. 4 is an isometric view of the driven rotor; and

Fig. 5 is an isometric view of the closure plate of the pump housing.

In the accompanying drawing there is illustrated diagrammatically and schematically, with proportions exaggerated for clarity, a flow sheet representation of the process of the present invention. As there shown, an aqueous solution of sodium hydroxide and a solution of sodium metasilicate hydrate are introduced into the inlet 11 of a rotary pump designated generally at 10. The pump 10 includes a stationary housing 12 containing an externally-driven rotor designated by the numeral 14, best illustrated in Fig. 4, and comprising a plurality of uniformly circumferentially-spaced fingers 16 adapted to be rotated by the shaft 18 of the rotor by a motor (not shown).

Within the confines of the cylinder defined by the rotor fingers 16 is disposed a toothed impeller designated generally by the numeral 20, also shown in Fig. 3, adapted to have its teeth 22 engaged by the fingers 16 of the driven rotor in the manner illustrated, the impeller 20 being mounted on an outstanding shaft 24 from a mixer-pump closure plate 26, shown in Fig. 5, adapted to be bolted on to the housing 12 as shown in Fig. 2. Thus, it will be understood that the impeller 20 is driven solely by rotation of the rotor 14 via camming action of the surfaces 21 of fingers 16 against the teeth 22 of the impeller, there being an extremely small operating clearance between the various fingers 16, impeller teeth 22 and projecting half-moon shaped element 30 as shown in Fig. 1 and Fig. 5. There results within the pump housing 12 an extremely small clearance between moving parts with the result that a high degree of shearing, dispersive mixing and self-cleaning is effected, there being discharged from the outlet 32 a sodium orthosilicate liquor which rapidly is transported and discharged upon a heated flaker indicated schematically at 40. As the flaker rotates in a counterclockwise direction, a doctor blade 42 removes dried flakes of sodium orthosilicate.

From the flaker 40, the silicate flakes drop into a rotary conditioner 50 comprising an unheated inclined zone which tumbles the product about as the product moves down through it to effect cooling prior to packaging. From the conditioner 50 the cooled product drops into a hopper 52 having feed control means indicated schematically at 56 and thence into a suitable container 54.

The metasilicate liquor generally should be introduced into the mixer-pump at a temperature within the range from about 80° to 100° C. although at times somewhat higher or lower temperatures can be used. Preferably, the metasilicate liquor temperature is within the range from about 85° to 95° C. The aqueous alkali metal hydroxide solution advantageously may be introduced into the mixer-pump at a temperature within the range from about 70° to 90° C., preferably 80° to 90° C.; temperatures below about 65°—70° C. generally should be avoided as solidification often will occur with higher concentrations of alkali metal hydroxide.

Generally, the orthosilicate liquor as initially formed, may suitably contain from about 5.5 to about 7.5 mols of water, considering compositions over the entire ratio range, namely, 1.75–2.25 $Na_2O:1SiO_2$. Thus, it is to be expected that the water content in the products may be about 6 mols or somewhat higher and as little as 5 mols, or less, depending upon the conditions that are employed in the process wherein a quantity of water is driven off.

Additionally, it will be apparent to those skilled in the art that the orthosilicate liquor may be constituted so as to contain more than about 7 mols of water. However, generally, it is found that as the water content of the orthosilicate liquor increases above about the 7 hydrate, certain properties of the liquor that are desirable in the process appear to diminish somewhat, in consequence of which thermal crystallization is interfered with to some extent. Accordingly, it is preferred to employ an orthosilicate liquor containing no more than about 7 mols of water, although it will be understood that the invention contemplates a process wherein a greater quantity of water may be present.

In order that those skilled in the art may more completely understand the present invention and the preferred methods by which the same may be carried into effect, the following specific examples are offered:

*Example 1*

An $Na_2SiO_3 \cdot 3.49H_2O$ solution at a temperature of 84° C. and 73% sodium hydroxide at a temperature of 90° C. are delivered into the inlet of a 2″ Viking pump, Model K 1–20. The resultant orthosilicate flows from the pump outlet down onto a flaking drum maintained at a temperature of about 155° C. Excellent quality sodium orthosilicate flakes are obtained and continuous operation for 5 hours is effected without difficulty occasioned by build-up of silicate deposits in the mixer-pump.

*Example II*

The procedure of Example I is repeated but a sodium metasilicate 3.30 hydrate is used at a temperature of 93° C. Continuous operation for 3 hours is effected without difficulty.

*Example III*

At a production rate of 24 tons per day, the procedure of Example I is repeated combining a sodium metasilicate (3.3 hydrate) liquor at a temperature of 89° and 73% NaOH at a temperature of 90° C. in a Viking mixer-pump. Analysis of the product indicates an $Na_2O:SiO_2$ ratio of 2.031 and an average solids content of 67.1% to 67.8%. During the run a total of 116,600 lbs. of product is obtained.

*Example IV*

To indicate more specifically the advantages of the present invention, a total of 24 different experimental runs are made following the procedure of Example I but using instead of a rotary gear mixer-pump a cone-shaped mixer wherein concentrated metal liquor enters a mixer vessel to the bottom by gravity flow and caustic is entered through a funnel as shown in the drawings in co-pending application Ser. No. 397,525. It is found, however, that the silicate is sensitive to the speed of the propeller and that because of an accumulation and/or deposit of orthosilicate in the mixer, continuous running time of not over about two hours could be realized before cleaning of the mixer is required.

*Example V*

A sodium metasilicate pentahydrate liquor, specific gravity @ 90° C. of 1.781, at a rate of 2.09 gallons per minute is evaporated to obtain 1.70 gallons per minute of a $Na_2O \cdot SiO_2 \cdot 3.50H_2O$ solution. To the latter stream is added 1.15 gallons per minute in a Viking mixer-pump of 73% aqeous sodium hydroxide (57.00% $Na_2O$). The resulting orthosilicate liquor $$(2Na_2O \cdot SiO_2 \cdot 6.06H_2O)$$

at a rate of 2.85 gallons per minute is flaked and conditioned to obtain 41.2 lbs. per minute of sodium orthosilicate flakes $(2Na_2O \cdot SiO_2 \cdot 5.1H_2O)$.

In the forepart of this specification, it was indicated that the invention is not required to be practiced in any particular type of apparatus and it is desired to again emphasize this fact. If it is desired, instead of employing heated rotating drums, the material may be deposited in a thin layer in heated casting pans, for example, in layers up to about one inch in thickness, though a lesser depth would be preferable. Additionally, the invention contemplates that the liquor to be processed may be sprayed into a heated zone so as to cause crystallization to take place in each separate droplet of such a spray. In such case, the temperature of the zone should be approximately that provided in the foregoing examples, the space of the zone affording ample settling time for the sprayed liquor so that crystallization is substantially complete before the droplets have settled.

It is to be understood that although the invention has been described with specific reference to particular embodiments thereof, it is not to be so limited, since changes and alterations therein may be made which are within the full intended scope of this invention as defined by the appended claims.

What is claimed is:

1. In the manufacture of solid, hydrated alkali metal silicates having an alkali metal oxide:$SiO_2$ molar ratio substantially within the range from about 1.75–2.25:1, from a mixture of an aqueous alkali metal metasilicate hydrate solution and the required amount of an alkali metal hydroxide to provide the desired alkali metal oxide:$SiO_2$ ratio within said range, by combining said alkali metal hydroxide and alkali metal metasilicate and agitating and heating the mixture to cause thermal crystallization of said hydrated silicate, the improvement which includes the steps of adding to said metasilicate hydrate solution an aqueous solution of an alkali metal hydroxide, agitating the mixture of said hydrate solution and said alkali metal hydroxide solution in a mixer-pump having at least one rotary toothed impeller, and heating the mixture sufficiently to cause thermal crystallization of the said hydrated silicate.

2. The method according to claim 1 wherein the metasilicate hydrate solution has a water content within the range from about 3.2 to about 3.6 mols of water per mol of metasilicate.

3. The method of claim 1 wherein the alkali metal silicates and the alkali metal hydroxide are sodium silicates and sodium hydroxide.

4. The method according to claim 2 wherein the alkali metal silicates and alkali metal hydroxide are sodium silicates and sodium hydroxide.

5. The method of claim 1 wherein the mixture of said hydrate solution and said sodium hydroxide solution are heated to a temperature substantially within the range from 100°–160° C. to cause crystallization of said hydrated silicate.

6. The method of claim 1 wherein the mixture of said hydrate solution and said sodium hydroxide solution is spread in a thin layer upon a heated surface maintained at a temperature between about 100°–175° C., and after crystallization of said mixture is effected in contact with said surface, the crystallized material is removed therefrom.

7. The method of claim 1 wherein the age of said mixture of hydrate solution and sodium hydroxide solution is not more than about 10 minutes at the time said mixture is spread upon said heated surface.

8. The method according to claim 1 wherein the metasilicate hydrate contains from about 3.4–3.5 mols of water per mol of metasilicate.

9. The method according to claim 1 wherein the mixer-pump has at least one rotary, toothed impeller and corresponding circumferentially-spaced openings to receive the teeth of said impeller whereby self-cleaning and intimate mixing are obtained.

10. The method according to claim 1 wherein the pump employs as impellers a gear within a gear.

References Cited in the file of this patent

UNITED STATES PATENTS

| 2,131,718 | McDaniel | Sept. 27, 1938 |
| 2,615,399 | Edwards | Oct. 28, 1952 |
| 2,619,292 | Nichols et al. | Nov. 25, 1952 |

FOREIGN PATENTS

| 772,852 | Great Britain | Apr. 17, 1957 |